United States Patent [19]
Huber

[11] Patent Number: 4,832,185
[45] Date of Patent: May 23, 1989

[54] ROLLER CONVEYOR TRACK

[75] Inventor: Thomas Huber, Iffeldorf, Fed. Rep. of Germany

[73] Assignee: Bavaria Cargo Technologie GmbH, Muchen, Fed. Rep. of Germany

[21] Appl. No.: 160,448

[22] Filed: Feb. 25, 1988

[30] Foreign Application Priority Data

Jul. 21, 1987 [DE] Fed. Rep. of Germany ....... 3724125

[51] Int. Cl.$^4$ .............................................. B65G 13/06
[52] U.S. Cl. .................................. 198/788; 244/137.1
[58] Field of Search ....................... 198/721, 722, 788; 193/35 R, 37, 780; 244/137.1, 137.3, 118.1, 118.2

[56] References Cited

U.S. PATENT DOCUMENTS 3,888,343  6/1975  Snyder ................................. 198/780

FOREIGN PATENT DOCUMENTS 1241091  7/1971  United Kingdom ................ 198/780

Primary Examiner—Robert J. Spar
Assistant Examiner—James R. Bidwell
Attorney, Agent, or Firm—Sughrue, Mion, Zinn, Macpeak, and Seas

[57] ABSTRACT

A roller conveyor track comprises a supporting structure in the form of a one-piece panel member providing a substantially flat surface from which U-shaped channels extend downwardly to accommodate rollers for movably supporting an article such as a freight container. The rollers project only slightly above the surface of the panel member. The rollers are rotatably carried by means of shaft portions at the ends thereof in snap-fitting mounting members which can be snap-fitted vertically downwardly into mounting openings in the side walls of the respective channel in the panel member.

8 Claims, 3 Drawing Sheets

ROLLER CONVEYOR TRACK

BACKGROUND OF THE INVENTION

Roller converor tracks are often used for example in freight loading systems in air freight traffic for conveying freight containers or other articles within the interior of the freight compartment of freight aircraft. Typically, a roller conveyor track which may be used in that situation comprises a plurality of rollers which are free-running and/or driven by an electric motor, disposed in succession at a spacing from each other in the direction of conveying movement, with their axes of rotation transverse relative to the direction of conveying movement. At least the free-running rollers are releasably mounted by means of shaft portions at the ends thereof, in openings provided in vertical side walls of an upwardly open channel configuration in a supporting structure. The supporting structure may comprise a plurality of upwardly open, U-shaped metal members which are anchored in mutually parallel relationship in the direction of conveying movement, to the bottom of the freight compartment. Provided in the side walls of the metal members and arranged in pairs in oppositely disposed relationship are rows of bores or holes in which the shaft portions on the conveyor rollers are suitably fixed.

One possible form of the arrangement for fixing and mounting the conveyor rollers in such a roller conveyor track is to be found in German patent specification No. 3 210 204. As the two side walls of the U-shaped members are fixed at a spacing relative to each other, that arrangement provides that the shaft portions which project away from the two axial ends of each roller are arranged to be such that they can be pushed axially into the roller so that the roller can be fitted into the U-shaped member by retracting the shaft portions in that way, with the two shaft portions then being fixed in the respective holes for receiving same. Fixing of the respective rollers is effected by a procedure which provides that, after the shaft portions have been pushed in, the roller is firstly fitted into position between the two side walls of the U-shaped member, and then a screw bolt is inserted from the outside of the side wall, through the bore, and screwed into an axial screwthread in the corresponding shaft portion of the roller so that the shaft portion is drawn into the opening in the side wall of the U-shaped member, and fixed in position therein.

A construction of that kind has a large number of mechanically movable components which are also of a really complicated configuration so that in general terms, besides a high level of manufacturing costs, that arrangement is also of a substantial weight which is a highly undesirable consideration, precisely in relation to use in an air freight system. In addition it is also essential that the outer side walls of the U-shaped members are kept freely accessible so that the rollers can be fitted or replaced by screwing the screw bolts in or releasing them, from the outside.

The need for the outside walls of the U-shaped members to be kept freely accessible thus means that the roller conveyor track is of a design configuration in which the individual U-shaped members project upwardly from the floor of the freight compartment, which in itself is a flat floor, thus resulting in a floor surface which is so-to-speak cluttered up with impediments and obstacles, in the form of the U-shaped members. In addition, there is always the risk of damage to the individual roller tracks as they project upwardly from the floor of the freight compartment in a free-standing and thus essentially unprotected fashion.

Entirely similar problems also arise in relation to drive roller units of such a roller conveyor track, which are provided at various points in the roller tracks, for driving the freight containers and the like which are to be conveyed thereon.

SUMMARY OF THE INVENTION

An object of the present invention is to provide a roller conveyor track which is of a simpler structure than previous such arrangements.

Another object of the present invention is to provide a roller conveyor track which provides a greater degree of structural integrity.

Still another object of the present invention is to provide a roller conveyor track which does not require a large number of mechanically movable components of complex configuration whereby the roller conveyor track can be produced at lower cost and at lower weight.

A further object of the present invention is to provide a roller conveyor track which is of such a construction that components thereof can be more readily interchanged and replaced as required.

Yet a further object of the present invention is to provide a roller conveyor track which has a substantially flat upwardly facing surface with support rollers projecting only slightly thereabove.

In accordance with the invention these and other objects are achieved by a roller conveyor track comprising a plurality of rollers which are arranged in succession at spacings from each other in the direction of conveying movement on the conveyor track, with their axes of rotation disposed at least substantially tranversely with respect to the direction of conveying movement. The rollers include rollers which are driven by electric motor means as well as freerunning rollers. At least some of the rollers, preferably at least the free-running rollers, are releaseably mounted by means of shaft portions projecting axially away from the respective roller at the two end faces thereof, rotatably in openings in vertical side walls of an upwardly open channel configuration of a supporting structure, the side walls extending at a spacing from each other and at least substantially parallel to each other in the direction of conveying movement. The supporting structure comprises a panel means formed from plate material and including horizontal upper cover plate portions and at least one channel which is shaped to project downwardly therefrom and which is open to the plane of the cover plate portions. Mounting openings are provided in the side walls of the channel configurations, starting from the upper region of the side walls and extending beyond the connecting edge at which the respective side wall is connected to the adjoining cover plate portion. Snap-fitting mounting means of resiliently deformable material are provided to be inserted by a snap-fitting action into respective ones of the mounting openings. Each said holding means includes a horizontal bore which fits on to the respective shaft portion of a respective said roller, the mounting means being adapted to be fitted into the mounting openings in a downward direction from above the cover plate portions and the channel configuration.

That roller conveyor track configuration in accordance with the invention therefore makes it possible for a roller to be fitted from above into the channel in the panel means, by virtue of the holding means which are fitted on to the shaft portions of the respective roller being suitably fitted downwardly into the respective mounting openings, without any need for the outsides of the side walls of the channels having to be kept accessible for assembly purposes. The panel means can therefore be provided with continuous cover plate portions thus generally providing a substantially flat and unencumbered freight compartment floor, above the top surface of which the rollers project only slightly. That arrangement not only substantially reduces the risk of damage and fouling under the rough conditions encountered in freight loading operations, but the arrangement of the invention also generally provides a design configuration which is very simple from a structural point of view and which involves a small number of components which in addition can be produced at an ecomonical level and which are of light weight.

In a preferred feature of the invention, each snap-fitting mounting means provides a lower opening or recess which, in the fitted condition thereof, embraces the lower edge portion of a respective mounting opening on both sides thereof, and an upper opening or recess with a horizontal locking shoulder which, in the operation of fitting same into position, snaps lockingly under a rearward edge of the mounting opening in a said cover plate portion. That construction ensures that the snap-fitting mounting means fixes the roller shaft portion which is inserted therein not only in a vertical direction but also in both directions axially of the respective roller and in a direction transversely thereto, in the channel configuration of the panel means.

A further preferred feature of the invention provides that the cover plate portions and the channel in the panel means are formed in one piece with each other, while preferably the horizontal cover plate portions form a substantially flat surface.

In such a design configuration, it is particularly advantageous for the panel means to be formed from a composite material such as fiber reinforced plastic material. That not only provides a low level of manufacturing costs but also gives low weight which is an advantageous consideration precisely in connection with air freight traffic.

The roller conveyor track in accordance with the invention also has rollers which are driven by electric motor means, for driving articles such as freight containers to be conveyed thereon, at various mounting locations in the channel configurations. Driven rollers of that nature may be fitted into the mounting openings in the same manner as the free-running support rollers referred to above, by means of corresponding snap-fitting mounting means. So that that can be achieved without the need to make the outward side walls of the channel configurations accessible from the outside, it may be provided in accordance with a further feature of the invention that, to provide for a supply of power to the driven rollers, conductor track bars are embedded insulatedly into at least one side wall of the channel configuration. The bars are exposed in the region beneath the mounting openings, towards the interior of the channel configuration, to constitute contact portions which co-operate with resilient contact means of a driven roller. That configuration makes it possible to fit the driven rollers at any desired mounting locations, to meet the individual requirements of any specific situation. It is only necessary for the shaft portions of the driven roller to be fitted into the appropriate snap-fitting mounting means and for the resulting assembly then to be fitted by a snap-engagement action into the respective mounting openings in the conveyor track structure. At the same time, that produces a conducting connection between the resilient contact portions of the driven roller in question, and the conductor track bars of the conveyor structure, to provide the supply of power to the driven rollers.

A preferred embodiment of the track arrangement according to the invention provides that each snap-fitting mounting means has a hole or aperture which is accessible from above in the fitted condition thereof, for the insertion of a tool for releasing the locking engagement of the above-mentioned locking shoulder under the co-operating edge of the mounting opening, by producing resilient deformation of the body of the mounting means, so that the roller can be removed from the channel in an upward direction at any time.

Further objects, features and advantages of the present invention will be apparent from the following description of a preferred embodiment thereof.

DESCRIPTION OF THE PREFERRED EMBODIMENT

Figure 1:
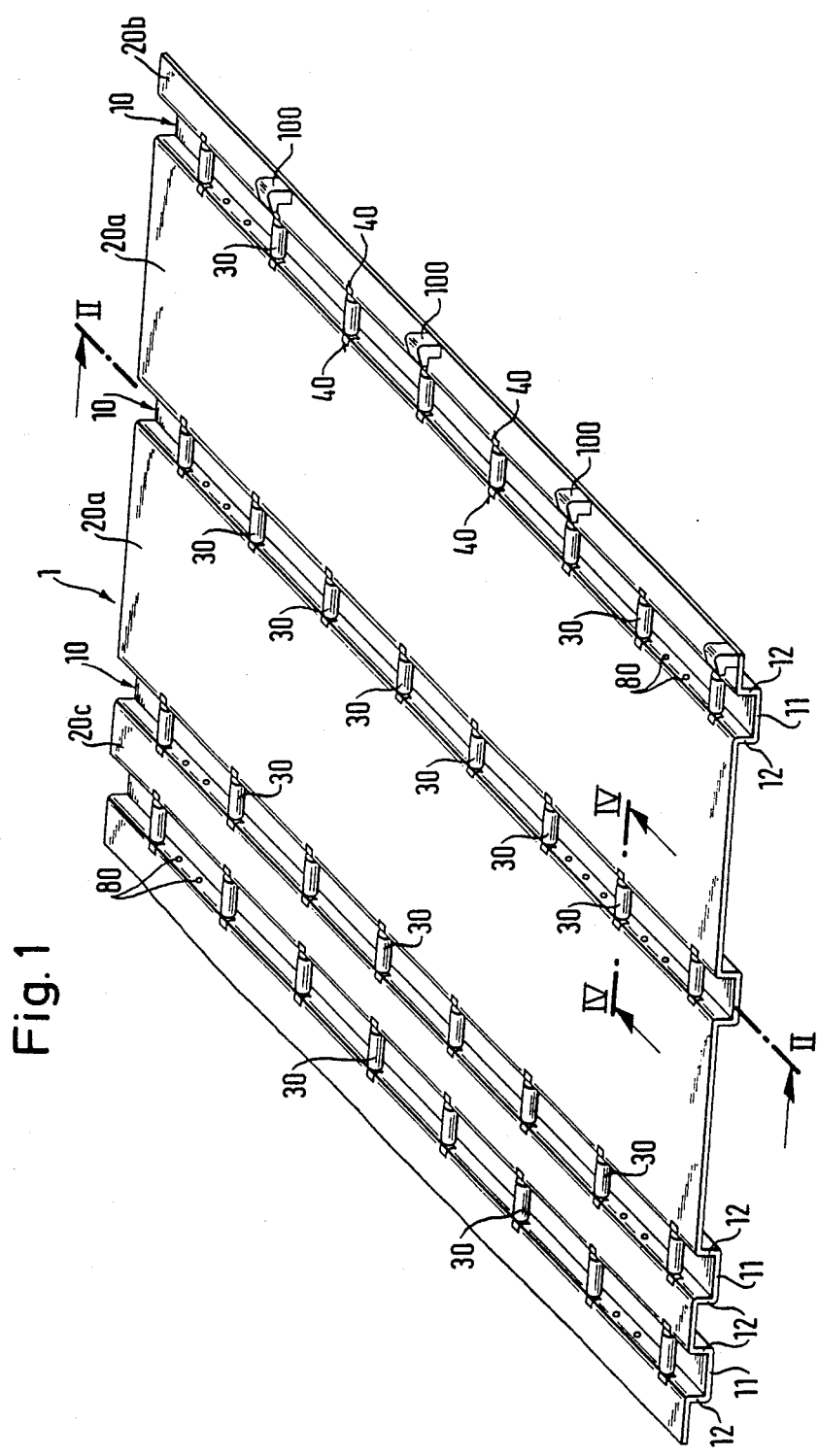
FIG. 1 is a diagrammatic perspective view of part of an embodiment of a roller conveyor track in accordance with the teachings of the present invention.

Referring firstly to FIG. 1, shown therein in a somewhat simplified perspective view is a part of an embodiment of a roller conveyor track in accordance with the invention. The roller conveyor track comprises a support structure with which the roller conveyor track can be fixed in position for example on the floor of a freight compartment of an aircraft, the support structure comprising an elongate panel configuration which includes a plurality of cover plate portions 20a, 20b and 20c which are disposed horizontally in a plane. Formed between each two adjacent plate portions 20a through 20c in downwardly projecting relationship are U-shaped channels 10 which are open in an upward direction, with substantially vertical side walls 12 and a bottom wall 11 which connects the side walls 12 of each channel at the lower end thereof. In practical use the bottom walls 11 of the channels 10 rest on and are secured to the floor of the freight compartment.

The entire panel structure 1 with plate portions 20a, 20b and 20c and the channels 10 which are matched to the practical requirements of any individual situation in regard to the number thereof and the relative spacing thereof is formed in one piece from a plate-like material comprising for example a composite material such as fiber-reinforced plastic material.

Figure 2:
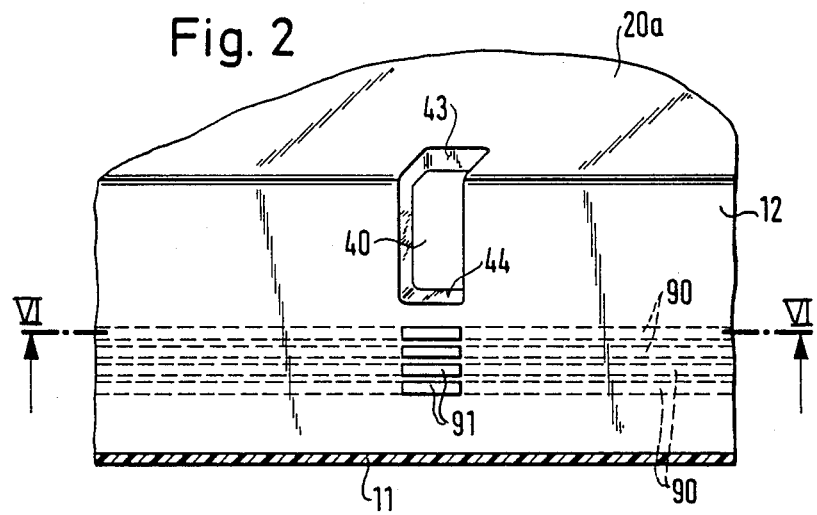
FIG. 2 is a view from the bottom left in FIG. 1 of part of a side wall of a channel configuration in the structure shown in FIG. 1, viewing on line II—II in FIG. 1.

Formed along the length of the channels 10 in pairs in oppositely disposed relationship and at spacings from each other in the longitudinal direction of each channel 10 are mounting openings or cut-outs as indicated at 20, the configuration of which can be clearly seen from FIG. 2. Referring therefore to FIG. 2, each mounting opening 40 comprises a generally rectangular aperture which begins in the upper region of the side wall of the respective channel 10, having a lower edge as indicated at 44. The aperture extends beyond the upper longitudinal edge of the side wall 12 and thus into the adjacent plate portion as indicated at 20a in FIG. 2, terminating therein with a rearward edge 43. The mounting opening 40 is thus in the form of a generally rectangular opening which extends entirely through the material of the panel structure 1 and which extends beyond the edge at which the side wall 12 of a channel 10 and the adjacent plate portion 20a meet. The mounting openings 40 serve to accommodate the snap-fitting mounting members 50 which are described in greater detail hereinafter and in which individual rollers as indicated at 30 in FIG. 1 of the conveyor track arrangement are mounted.

Referring still to FIG. 1, also provided in side walls 12 of the channels 10 at different locations are fixing holes 80 which are disposed in pairs and which serve for mounting clamps (not shown) by means of which articles such as freight containers can be fixed in position at a desired location on the roller conveyor track, once transportation movement thereof on the track has been concluded.

In addition, disposed at spacings from each other along the side edge of the panel structure 1 which is shown at the right in FIG. 1 are a plurality of guide jaws 100 which serve to guide an article such as a freight container as it is conveyed along the conveyor track as well as for fixing the freight container in position in a lateral direction, in the condition of storage thereof on the conveyor track. The guide jaws 100 are in the form of an inverted L-shaped member, with the free limb portion of the L-shape being intended to engage over a longitudinally extending flange portion which is in projecting relationship at the side edges of the bottom of each of the freight containers.

Figure 4:
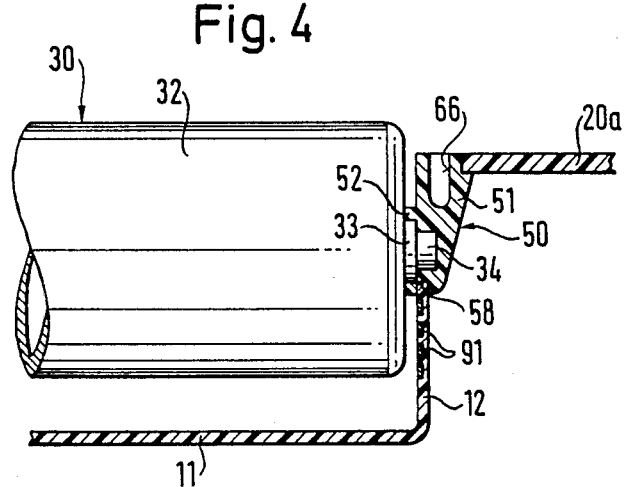
FIG. 4 is a view of part of the structure shown in FIG. 1 in section taken along line IV—IV in FIG. 1, showing a roller with a snap-fitting mounting member in the condition of being snap-fitted into position.

The individual rollers of the conveyor track are of a conventional construction for example in the form of free-running support rollers. As shown in FIG. 4, they comprise a generally hollow cylindrical roller body 32 having rolling bearing assemblies (not shown) disposed in concentric relationship in the two axially facing end surfaces of the roller body. The inner bearing race of each rolling bearing assembly is provided with an axially outwardly projecting bearing shoulder or collar as indicated at 33 in FIG. 4, and is carried on a shaft portion 34 which also projects radially outwardly from the roller body. The above-indicated arrangement of each rolling bearing assembly provides that the roller body 32 is freely rotatable relative to the shaft portion 34, while the shoulder or collar 33 ensures that the roller body 32 is held at a suitable spacing relative to the adjacent supporting structure, in that case the side wall 12 of a channel as indicated at 10.

Instead of a free-running support roller of that kind, individual locations at which rollers are provided in the roller conveyor track may be provided, as necessary according to the requirements of any individual situation, with a respective drive roller unit which is adapted to be driven for example by means of an electric motor and which is externally the same in terms of its dimensions to a free-running support roller but which includes a mechanism for driving the roller, serving to convey a freight container on the roller conveyor track. Drive roller units of that kind are described in greater detail in co-pending application U.S. Ser. No. 160,427, filed Feb. 25, 1988 the content of which is thereby incorporated by reference thereto.

As already mentioned, the individual rollers 30 are mounted by means of snap-fitting mounting members 50 in the mounting openings 40 in the panel structure 1.

Figure 3:
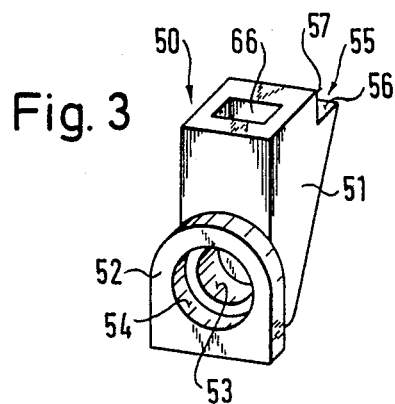
FIG. 3 is a perspective view of an enlarged scale of a snap-fitting mounting member.
Figure 5:
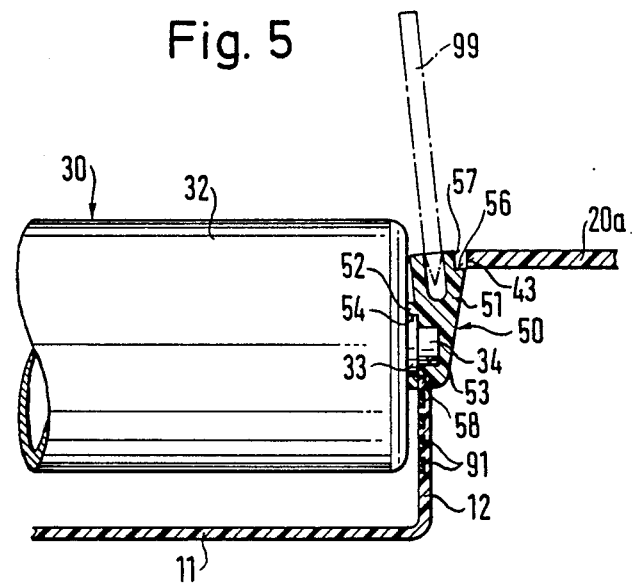
FIG. 5 is a similar view to that shown in FIG. 4, illustrating the way in which a tool may be inserted and the body portion of the mounting member may be resiliently deformed to release the locking shoulder thereof from beneath the rearward edge of a mounting opening in the conveyor track structure, for removing the mounting member in an upward direction.

Referring now to FIGS. 3 through 5, a mounting member 50 of that nature has a body 51 which is of a cross-section such as to taper inwardly in a downward direction as viewed in for example FIG. 3, thus providing a generally wedge-shaped member, through the associated axis of rotation of a roller 50. In the lower portion of the vertical side of the body 51 which is towards the roller 50, the body 51 has a generally annular projection as indicated at 52 for example in FIG. 3. Formed in the region of the projection 52 and within same is a large-diameter bore 54 which is adjoined inwardly of the body 51 and in concentric relationship by a smaller-diameter bore as indicated at 53 which in the illustrated embodiment terminates as a blind bore. The larger-diameter bore 54 is approximately matched in terms of depth and diameter to the mounting shoulder or collar 33 on the roller 30 while the smaller-diameter bore 53 approximately corresponds in respect of depth and diameter to the free projecting part of the shaft portion 34 of the roller 30. As can be seen from FIGS. 4 and 5, in the lower part, under the bores 53 and 54, each mounting member 50 has a lower recess or groove which extends transversely with respect to the bores 53 and 54 and which is of rectangular cross-section, the configuration of the recess or groove 58 being adapted to the configuration of the lower edge 44 of the mounting opening 40 so that in the fitted condition of the mounting member 50, the recess or groove 58 embraces the edge 44.

Formed in the upper edge of the tapered body 51, which is remote from the annular projection 52, is an upper recess as indicated at 55 in FIG. 3, which is defined by a vertical surface indicated at 57 in FIG. 5 and a horizontal surface indicated at 56, thus forming a locking shoulder co-operable with the rearward edge 43 of the respective mounting opening 40.

The entire mounting member 50 is made in one piece as by molding and comprises a resiliently deformable material, for example a plastic material.

For the purposes of fitting and mounting a roller 50 in a channel 10 in the panel structure 1, a mounting member 50 is firstly fitted on to one of the two shaft portions 34 of the respective roller 30 in such a way that the shaft portion 34 in question is accommodated in the smaller-diameter bore 53 while the mounting shoulder or collar 33 extends into the larger-diameter bore 54. The roller 30 with two mounting members 50 fitted thereon in the above-described manner is introduced downwardly into the channel 10 in such a way that the two mounting members 50 pass with their tapered end downwardly into the two mutually oppositely disposed mounting openings 40 in the channel 10. By applying a vertical force in a downward direction the outer inclined surfaces of the tapered body 51 of the respective mounting members 50 slide along against the rearward edge 43 of each mounting opening 40, with the tapered body 51 being resiliently bent towards the roller in the upper region thereof, in the manner shown for example in FIG. 5. Finally, that fitting movement causes the lower recess or groove 58 of the body 51 to embrace the lower edge 44 of the mounting opening 40, while the locking shoulder 56 defined by the upper recess 55 engages under the underside of the edge 43 of the opening 40 so that it snaps into position under that edge 43, due to the resiliency of the body 50 which has been deformed towards the roller 30, as indicated above. In that condition, the mounting member 50 and therewith also the roller 30 carried thereby are fixed in position in the radial direction relative to the axis of rotation of the roller by virtue of the lower recess 58 and also in a vertical direction upwardly by the locking shoulder 56, and finally, in the direction of the channels 10, by the vertical side walls of the mounting opening 40 which are disposed with a slight clearance against the corresponding side surfaces of the mounting member 50.

To release the mounting member 50 and to remove the roller 30 from the channel, the mounting member 50 has a blind hole 66 which is formed in the upper part thereof and which is exposed in the upper horizontal surface of the mounting member 50, in the fitted condition thereof, as can be most clearly seen from FIG. 4. FIG. 5 shows that the hole 66 is intended to accommodate a suitable tool 99 with which the body of the mounting member 50 can be resiliently bent in its upper region towards the roller 30 in such a way that the locking shoulder 56 comes free from its position of engagement against the underside of the rearward edge 43 of the mounting opening 40 so that the roller can be drawn upwardly out of the channel 10, together with the two mounting members 50 which carry it.

In that way individual rollers can be easily replaced, for example for the purposes of maintenance of in the event of damage thereto, or can be exchanged for drive roller units. That means that the roller conveyor track in accordance with the invention may be adapted to the requirements of any individual situation at any time without involving a substantial amount of work.

Figure 6:
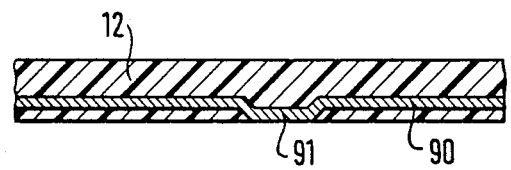
FIG. 6 is a view in section through part of a side wall of a channel of the conveyor track structure, in section taken along line VI-VI in FIG. 2.

As can be seen in particular from FIGS. 2 and 6, conductor track bars 90 which extend in mutually parallel relationship in the longitudinal direction of the roller conveyor track and which comprise electrically conductive material are insulatedly embedded in a side wall of a channel 10. The bars 90 serve to supply power to driven drive roller units, as described in greater detail in the above-mentioned co-pending application.

The bars 90 extend over the major part of their length within the material of the respective side wall 12, as shown in FIG. 6, so that in that region they are embedded in a completely insulated fashion. It is only in the region beneath each mounting opening 40 that the bars 90 are brought out to the interior of the respective passage 10 so that the surface of the respective bars 90 is exposed in an un-insulated condition at that location, constituting contact portions 91. When a drive roller unit of the above-indicated kind is fitted into position at the corresponding roller mounting location, resiliently biased contact portions which are carried by the drive roller unit come to bear against the contact portions 91 so that the drive roller unit is readily electrically connected to the power supply through the bars 90, in the operation of fitting the drive roller unit into position. In that way free-running support rollers and drive roller units may be fitted at any appropriate locations in the roller conveyor track in accordance with the invention, without involving electrical connecting operations to provide for the supply of power to the driven rollers.

It will be appreciated that the above-described arrangement has been set forth solely by way of example and illustration of the present invention and that various modifications and alterations may be made therein without thereby departing from the spirit and scope thereof.

What is claimed is:

1. In a roller conveyor track comprising a supporting structure providing an upwardly open channel having vertical side walls disposed at a spacing from each other and extending parallel to each other in the direction of conveying movement, and a plurality of free-running support rollers arranged on said supporting structure in succession at a spacing from each other in said direction of conveying movement on the conveyor track with their respective axes of rotation disposed at least substantially traversely with respect to said direction of conveying movement, each said roller having mounting shaft portions projecting axially away from the two end faces thereof, and each said roller being mounted by means of said shaft portions rotatably in openings in said side walls of said channel, the improvement that: said supporting structure comprises a panel means which is formed from plate material and includes horizontal upper cover plate portions and at least one said channel which is shaped to project downwardly therefrom and which is open to the plane of said plate portions, said mounting openings in said side walls extend in the upper region thereof beyond the connecting edge at which the respective side wall connects to the adjoining plate portion; snap-fitting mounting members of elastically deformable material are provided, which are adapted to be fitted by a snap fit downwardly into said openings and which each have a mounting means adapted to receive a respective said shaft portion of a respective said roller; and at least one electrically drivable drive roller is provided for driving an article on said conveyor track, wherein, to provide for a supply of power to said at least one drive roller, conductor track bar means are embedded insulatedly in at least one side wall of said channel, said bar means being exposed in the region under said openings towards the interior of said channel to constitute contact portions, said drive roller having resilient contact means adapted to co-operate with said contact portions.

2. A roller conveyor track as set forth in claim 1 wherein said at least one drive roller is adapted to be driven by electric motor means.

3. A roller conveyor track as set forth in claim 1 or 2 wherein each mounting member has a lower recess which in the fitted condition of the member embraces the lower edge of a said opening on both sides thereof, and an upper recess having a horizontal locking shoulder portion which in the operation of fitting same into position snaps lockingly under an edge of said opening.

4. A roller conveyor track as set forth in claim 1 or 2 wherein said plate portions and said channel in said panel means are formed in one piece.

5. A roller conveyor track as set forth in claim 1 or 2 wherein said plate portions form a substantially flat surface.

6. A roller conveyor track as set forth in claim 1 or 2 wherein said panel means is formed from a composite material.

7. A roller conveyor track as set forth in claim 6 wherein said composite material is fiber reinforced plastic material.

8. A roller conveyor track as set forth in claim 3 wherein each said mounting member has a body portion with an aperture accessible from above in the fitted condition thereof, for the insertion of a tool for releasing the locking engagement of said locking shoulder portion from under said edge of said opening, by producing elastic deformation of said body portion.

* * * * *